(No Model.)
L. B. SMITH.
GARDEN TOOL.
No. 602,370.  Patented Apr. 12, 1898.
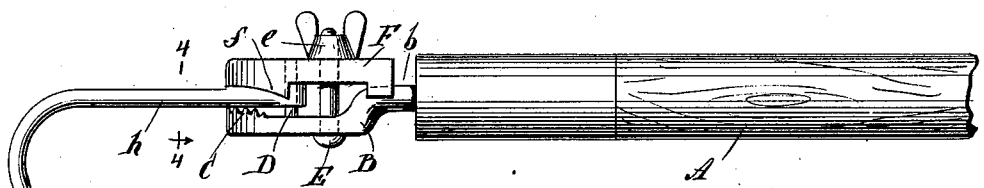
Fig. 1
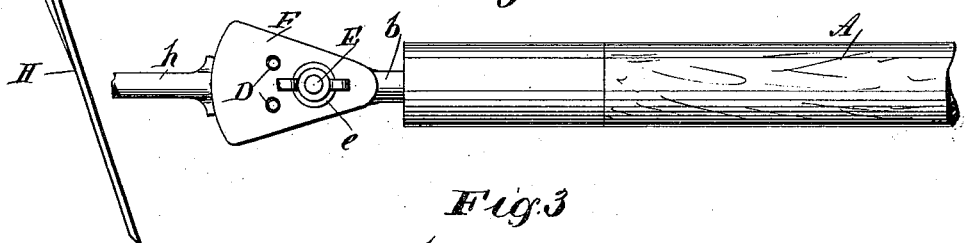
Fig. 2
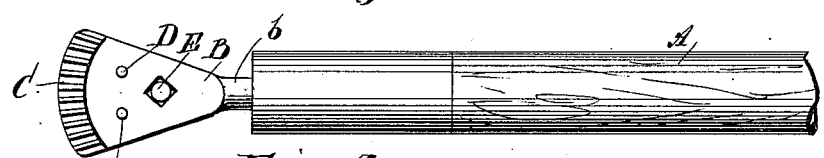
Fig. 3
Fig. 5 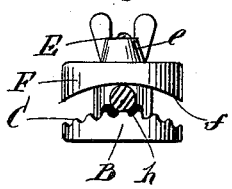 Fig. 4 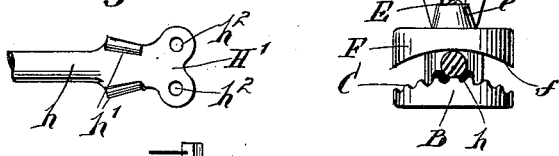 Fig. 6 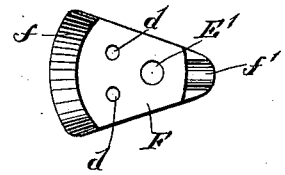
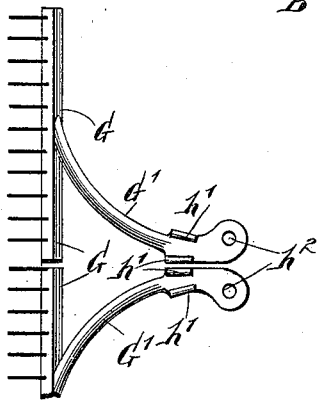
Fig. 7
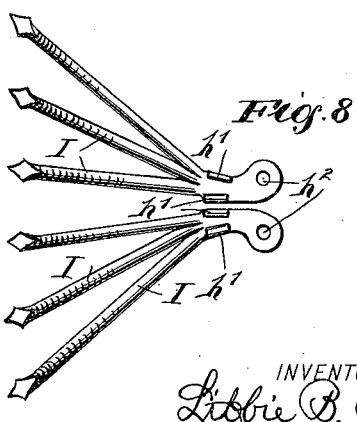
Fig. 8
WITNESSES:
Johna Bergstrom
H. L. Reynolds.
INVENTOR
Libbie B. Smith
BY
ATTORNEYS.

UNITED STATES PATENT OFFICE.

LIBBIE B. SMITH, OF BELLE PLAIN, IOWA.

GARDEN-TOOL.

SPECIFICATION forming part of Letters Patent No. 602,370, dated April 12, 1898.

Application filed August 27, 1897. Serial No. 649,716. (No model.)

*To all whom it may concern:*

Be it known that I, LIBBIE B. SMITH, of Belle Plain, in the county of Benton and State of Iowa, have invented a new and Improved Garden-Tool, of which the following is a full, clear, and exact description.

My invention relates to certain improvements in garden-tools, such as hoes, rakes, and diggers of various kinds.

My invention consists of certain features of construction, which will be hereinafter described and claimed.

Reference is to be had to the accompanying drawings, forming a part of this specification, in which similar characters of reference indicate corresponding parts in all the figures.

Figure 1 is a side elevation of my device with a hoe attached thereto. Fig. 2 is a top plan view of the same with the blade of the hoe broken away. Fig. 3 is a top plan view of the handle with attached head. Fig. 4 is a sectional view taken upon the line 4 4 of Fig. 1. Fig. 5 is a bottom plan view of the shank end of the hoe. Fig. 6 is a bottom plan view of the clamping-block, and Figs. 7 and 8 are plan views of heads of different kinds which may be attached to my device.

The object of my invention is to provide a handle having an adjustable head, so that a number of different kinds of garden implements may be attached to the head, and also to so construct said head that the various tools when attached thereto may be adjusted and yet be retained in such position that the lower or operating points or parts thereof will be level when the implement is held in position for use.

The portion of one end of the handle is represented at A, and to said end is attached the shank $b$ of the head B. This head is widened at its outer end and forms a triangular plate and has two pivot-pins D projecting from the upper surface thereof The outer end of said head is shown as curved. This construction is preferable, although not essential. The upper surface of the head adjacent to said curved end is provided with a series of locking-teeth C, adapted to engage the shank of the tool which is to be attached to the device.

A clamping-plate F coöperates with the head B to secure the tools in place. Through an aperture in the head B and an aperture E' in the clamping-plate F passes a locking or clamping bolt E, having a thumb-nut $e$ upon one end thereof. Said locking-plate F is provided with a notch or recess $f'$ in its rear end, adapted to embrace the shank $b$ of the head B. Two holes $d$ are formed in the clamping-plate and are adapted to register with the locking-pins D, the upper ends of which enter said holes. The inner end of the clamping-plate F is curved similarly to the outer end of the head B, which is attached to the handle. The outer end $f$ is also curved in a vertical plane, as shown in Fig. 4, and the toothed section upon the head B is curved similarly. This, as will be hereinafter described, provides for the adjustment of the halves forming the shanks of certain tools, so that the points thereof will be level in the working position of the handle whether the tools are adjusted outwardly or inwardly.

The hoe H, which is shown in Figs. 1 and 2, is provided with a shank $h$. The rear end H' of this shank is flattened and is provided with holes $h^2$, adapted to pass over the pivot-pins D. It is also provided with teeth $h'$, adapted to engage the teeth C upon the fixed head B. When the rear end H' of the shank is placed over the pins D and the clamping-plate F is thoroughly secured thereto, the hoe will be securely held upon the handle.

In Figs. 7 and 8 a rake G and a digger or hoe formed of a number of teeth are shown. These tools are each divided into two parts upon a central line. The shank of each half of the rake C is provided with a hole $h^2$, adapted to pass over one of the pivot-pins D, and is also provided with locking-teeth $h'$, adapted to engage the teeth C upon the fixed head B. Similarly each half of the digger shown in Fig. 8 is provided with a number of teeth I and the shank with a hole $h^2$ and teeth $h'$, adapted to be engaged with the pivot-pin D and teeth C upon the head B.

With tools of this character which are divided into right and left halves the halves may be separated from each other, if desired, for any purpose. If this were done with the outer ends of the fixed head B and were the clamping-block F straight and parallel, the position of the teeth upon the tools would not remain straight or in the proper plane.

By making the toothed surface C curving in a vertical plane, as shown in Fig. 4, and making the corresponding portion of the clamping-plate F also curved the angular adjustment of the parts of the tool-heads will be changed, so that the tips of the teeth will be all on a level when the handle is in the position occupied when the tool is in use. The number of forms of tools which may be attached to this handle is not limited. Any form of garden-tool may be made so that it may be attached thereto. The device thus makes it possible to have a number of garden-tools which may be used upon the same handle and which may be quickly and easily changed.

Having thus fully described my invention, I claim as new and desire to secure by Letters Patent—

A garden-tool having a handle, a head provided with a shank fitted to the handle, the head being flattened and provided with locking-teeth on its upper face adjacent to its upper edge, the head being also provided with two locking-pins projecting from its upper face, a clamping-plate having a recess at its inner end, the recess receiving a portion of the shank of the head, the clamping-plate also having two orifices respectively receiving the locking-pins of the head, a bolt passed between the head and clamping-plate to hold the two rigidly together, and a tool proper having two holes respectively receiving the locking-pins and having a shank portion provided with teeth coacting with the teeth of the head, such shank portion being pressed firmly between the head and clamping-plate.

LIBBIE B. SMITH.

Witnesses:
W. W. BENSON,
W. C. SCRIMGEOUR.